(12) United States Patent
Kimbell et al.

(10) Patent No.: US 6,643,665 B2
(45) Date of Patent: Nov. 4, 2003

(54) SYSTEM FOR SETTING IMAGE INTENT USING MARKUP LANGUAGE STRUCTURES

(75) Inventors: Benjamin D. Kimbell, Fort Collins, CO (US); Lisa M. Geer, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 380 days.

(21) Appl. No.: 09/853,958

(22) Filed: May 10, 2001

(65) Prior Publication Data

US 2003/0014416 A1 Jan. 16, 2003

(51) Int. Cl.[7] .................................................. G06F 7/00
(52) U.S. Cl. .................... 707/104.1; 707/10; 707/103 R
(58) Field of Search ............................. 707/100–104.1, 707/1–10; 345/618–619, 63.4, 65.6, 667

(56) References Cited

U.S. PATENT DOCUMENTS

| | | | | |
|---|---|---|---|---|
| 5,706,457 A | * | 1/1998 | Dwyer et al. | 345/835 |
| 5,778,223 A | | 7/1998 | Velissaropoulos et al. | 395/611 |
| 5,819,062 A | | 10/1998 | Srikantappa | 395/500 |
| 5,970,494 A | | 10/1999 | Velissaropoulos et al. | 707/102 |
| 6,182,076 B1 | * | 1/2001 | Yu et al. | 707/10 |
| 6,463,426 B1 | * | 10/2002 | Lipson et al. | 707/3 |
| 6,557,102 B1 | * | 4/2003 | Wong et al. | 713/176 |

* cited by examiner

*Primary Examiner*—Greta Robinson
*Assistant Examiner*—Linh Black (57) ABSTRACT

An intent file describes an intent that is set on an image acquisition device, a computer, or web site. The image intent file is capable of storage in a storage device of an information handling system. The intent file complies with a markup language grammar structure that emulates the image acquisition device's physical structure. The image intent file associates an image with the image acquisition device and associates an intent with the image. The structure of the intent file specifies the physical structure of the image acquisition device and allows for distributed intent execution. A profile describes and creates a base architecture for creating and executing intent on the image acquisition device. The image intent file specifies intent specific to a particular image contained in the image acquisition device memory.

20 Claims, 5 Drawing Sheets

SYSTEM FOR SETTING IMAGE INTENT USING MARKUP LANGUAGE STRUCTURES

BACKGROUND OF THE INVENTION

Convenience and flexibility of digital photography has resulted in its increasing popularity. Digital cameras produce photographic images in a digital format that are easily saved to a personal computer or other type of information handling system. The digital images can be transmitted using common communication techniques to a wide variety of destinations. The increasing availability of inexpensive scanners allows users to scan print photographs into the digital format for communication to an information handling system for storage. The digital photographic images can be viewed on a display connected to the information handling system, and transmitted by electronic mail or other communication techniques to other destinations for viewing by another user.

One of the most convenient aspects of digital photography is the capability to easily capture photographic images and transmit the images to multiple various destinations with little bother or handling. Conventional photography normally entails capture of images on a full roll of film, developing of the film with an inherent delay until the images become available, and communication of the images by slow techniques such as mailing or transporting the images. Digital photography allows capture of individual images, docking of the camera to a communication interface, and transmission of the images from the interface for transmission to a large number of diverse destinations for display or storage.

The flexibility of digital photography with an abundance of possible usages, destinations, providers, and facilities available for digital camera users creates a need for manageable methods to facilitate communication of images among multiple users. In fact, although digital cameras are highly simple and efficient to use, difficulty arises in transferring the images to the various destinations. Image transfer entails downloading the images to a computer and calling various special-purpose programs to control transfer.

SUMMARY OF THE INVENTION

What is needed is a system and method that simplifies and expands the communication of image data from a device such as a digital camera or scanner to a myriad of various digital image destinations.

In accordance with an aspect of the present invention, an intent file describes an intent that is set on an image acquisition device such as a camera or scanner, or set on a computer, workstation, personal computer, or web site. The image intent file can be created by operation of a device such as the image acquisition device, stored in a storage device of an information handling system, and transferred to various devices in the information handling system. The intent file complies with a markup language grammar structure that emulates the physical structure of a camera or scanner. The image intent file associates an image with the acquisition device and associates an intent with the image. The structure of the intent file specifies the physical structure of the camera or scanner. A profile describes and creates a base architecture for creating and executing intent on the image acquisition device (camera or scanner), personal computer, or web site. The image intent file specifies intent specific to a particular image contained in the image acquisition device memory.

The profile and intent file map the physical structure of a camera or scanner using data structures that are easily extensible and modular, facilitating adaptation to future technologies, and simplifying debug and modification.

In an illustrative embodiment, the intent file complies with eXtensible Markup Language (XML) standards that are widely used on the Internet so that devices compliant with industry standard can parse the intent file.

According to another aspect of the present invention, the image intent file is easily extensible to exploit future technological advances that can be simply added to the image intent file and profile. In one example, when a successful web TV wireless upload becomes available, the web TV destination can be added to a list of share options for the image acquisition device. Extensibility to future technologies is device-specific (camera or scanner-specific).

The technique for setting intent for an image acquisition system that includes, for example, a digital camera or scanner, facilitates extension to technologies that are predefined and difficult to change. The image intent is sufficiently generic that the simple adding of a new tag enables new destinations without compromising any existing systems. Addition of new tags is functionally independent of any existing tags.

In accordance with another aspect of the present invention, intent is honored by distributed intent. Intent is the act of marking images or files with a distribution destination. Examples of destinations include e-mail, print, post to web, and the like.

Intent is fulfilled by a specific service and medium while not affecting the remaining intent specified in the intent file. Thus intent is executed through multiple media and services independently. In one example, if intent is associated to an object such as email to "mom" and post to "web TV", the email intent is fulfilled by connecting the device (the camera) into a telephone jack while maintaining the post-to-web TV intent specific to the object. At an indefinite later time, wireless transfer can execute the post-to-web TV. The distribution of intent permits the user to fulfill a portion of the intent when convenient, without disturbing other items of intent. The illustrative system organizes the intent and distributes the intent to different devices while maintaining any unfulfilled intent.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DESCRIPTION OF THE EMBODIMENT(S)

Figure 1:
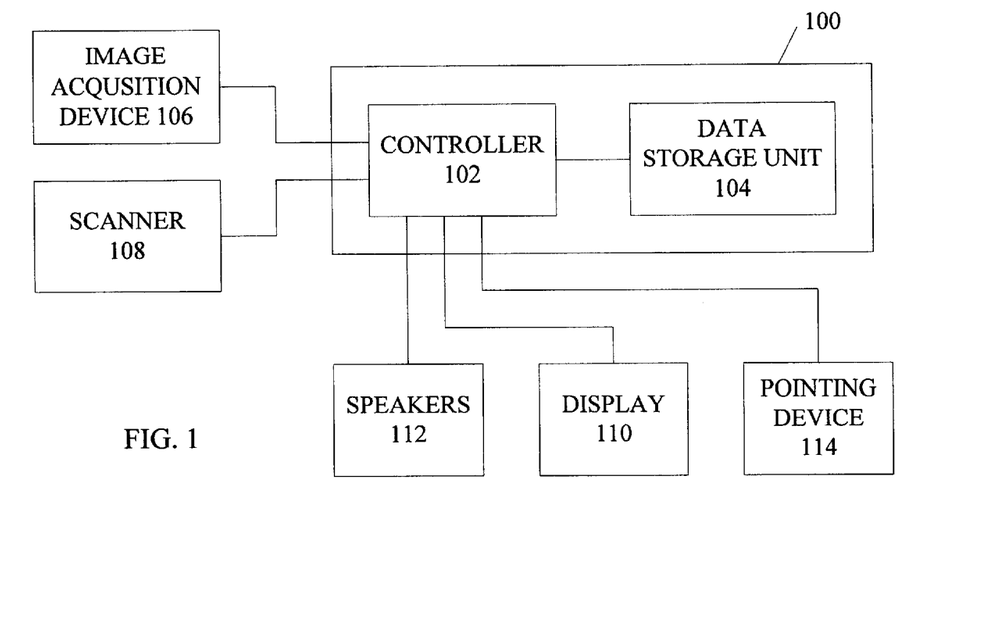
FIG. 1 is a schematic block diagram depicts an example of an information handling system that is suitable for implementing an image intent system.

Referring to FIG. 1, a schematic block diagram depicts an example of an information handling system 100. In various applications, the information handling system 100 may be a personal computer, a workstation, a computer, a data entry terminal, an electronic kiosk, an Internet appliance, a personal digital assistant (PDA), a thin client, a wireless telephone, or any other device adapted to handle analog or digital information. The information handling system 100 has a controller 102 that controls operations and functions of the information handling system 100. In various examples, the controller 102 may be a processor, a microprocessor, a digital signal processor, a microcontroller, an application-specific integrated circuit (ASIC), field-programmable gate array (FPGA), or any other device adapted to control an information handling system 100.

In one embodiment, the information handling system 100 has a data storage unit 104 for storing data such as image data but also other data types. The data storage unit 104 is electrically connected to the controller 102, typically via a data bus. In various applications, the data storage unit 104 may be a hard disk drive, a flash memory, a removable disk cartridge, a compact disk, an optical disk, or any other device adapted to store data.

In another embodiment, the data storage unit 104 is located external to the information handling system 100, and connected to the information handling system 100 via the controller 102. The external data storage unit 104 may be a remote server, storage area network, information handling system, or other device remotely accessible by the information handling system 100 via a communications network such as the Internet.

The information handling system 100 has an interface such as a serial connection, a USB port, an infrared or other wireless connection, a local area network, or another type of connection. The information handling system 100 can communicate via the interface with a digital image acquisition device 106, such as a digital camera. The digital image acquisition device 106 may be connected to the information handling system 100 to transmit or download data, such as image and audio data, to the data storage unit 104 via the controller 102.

The information handling system 100 may also communicate via the interface with a scanner 108. After connecting to the information handling system 100, the scanner 108 can transmit or download data, such as image and audio data, to the data storage unit 104 via the controller 102.

The information handling system 100 includes or is connectable to a display 110 via the controller 102. In various applications, the display 110 can be a cathode ray tube, a liquid crystal display, a plasma display, or any other type of display adapted to display information such as images and text to one or more users.

The information handling system 100 also includes or is connectable to one or more speakers 112 via the controller 102. Speakers are any types of audio speakers over which audio data can be played to one or more users.

The information handling system 100 may include or be connectable via the controller 102 to a pointing device 114 such as a mouse, trackball, touchpad, or any other device adapted to move a pointer on the display 110 in the context of a graphical user interface. The pointing device 114 typically has a selection control, such as a mouse button, through which a user can position a cursor and actuate or otherwise select an item on the display.

Figure 2:
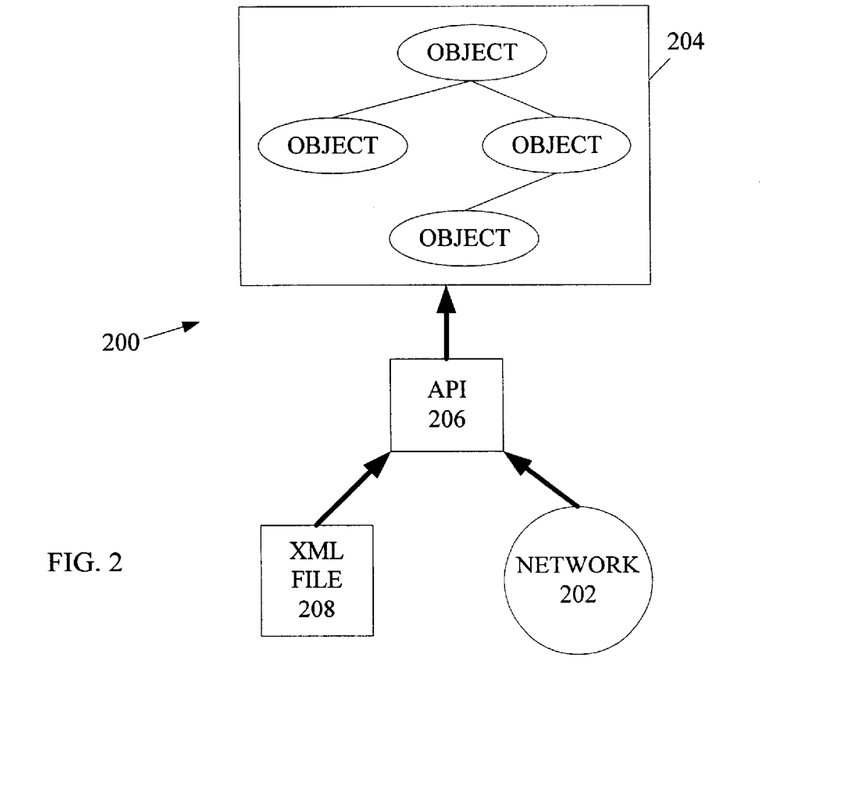
FIG. 2 is a schematic block diagram that illustrates an example of a communication system for intercommunicating among a wide variety of devices over a communication network.

Referring to FIG. 2, a schematic block diagram illustrates an example of a communication system 200 for intercommunicating among a wide variety of devices over a communication network 202 such as the Internet. A document object module 204 uses application programmer interface (API) libraries 206 to access Extensible Markup Language (XML) data in an XML file 208 to construct a tree of data objects that form the document object module 204. XML is a system that defines, validates, and allows for sharing of document formats.

XML uses tags to distinguish document structures, and attributes to encode extra document information. XML syntax and operation are similar to Standard Generalized Markup Language (SGML) and HyperText Markup Language (HTML). XML is a standard markup language that complies with SGML so embed presentation information in a markup. XML is a standard that permits information content to be completely separate from software and hardware that render and display the content.

A tag is a text string that describes a unit of data, also called an element, in XML. The tag is distinguishable as markup, rather than data, by angular brackets (<>). For example, a "group" element has a start tag <group> that can designate the group name, and an end tag </group> which enclose group data. The markup syntax is operated upon as data by using an "entity" reference or a character data (CDATA) section. An entity reference is a reference to an entity that is substituted for the reference when an XML document is parsed. The entity reference may reference a standard predefined reference, or a reference that is predefined in a document type definition (DTD) or schema. DTD entity references are defined in a local subset of the DTD or defined in an external XML file. A predefined XML tag for character data (CDATA) relates to characters that are not to be interpreted. Typically, CDATA sections are used to signify examples of XML syntax.

The API 206 is an event-driven, serial-access system that does element-by-element processing of XML data from the XML file 208. The API 206 reads and writes XML to a data repository on the communication network 202.

The document object module 204 is an application program interface that supplies a tree structure of objects to perform desired operations. The document object module 204 can be used to manipulate the hierarchy of objects encapsulated within the document object module 204. The document object module API 204 is highly suitable for interactive applications because the entire object model is concurrently present in memory to facilitate access and manipulation by a user.

Intent is set for an image acquisition device such as a camera or scanner using an intent file that is expressed in a markup language structure that emulates the physical structure of the image acquisition device. A profile and intent file are used to define the structure. The profile and intent file associate an image with an image acquisition device and associate an intent with the image.

In an illustrative embodiment, the profile executes on a camera processor that is typically internal to the camera and generally controls various camera functions including control of image acquisition and storage. The image intent file is associated with particular images, as specified by the profile, and moves with an image as the image is transferred to the destinations specified by the profile. The image intent file also executes on the camera processor and also migrates to execute on various other processors in a destination stream from the camera processor to the final image destination. Processors in the destination stream may include, for example, a personal computer or a computer with a wireless connection.

Intent is honored by a distributed intent method. Intent is the act of marking images or files with a distribution definition. Examples of distribution objects include email, print, post-to-web, and the like.

A camera or scanner intent document type definition (DTD) is a DTD or schema specification that is part of an extended markup language (XML) specification. The DTD specifies kinds of tags that can be included in an XML document, and specifies which tag arrangements are valid. XML tags, called a "markup" describe the meaning of data, not simply how data is to be displayed. An XML tag acts in the manner of a field name in the program, supplying a label that identifies the piece of data. In the manner that field names define a data structure, XML tags can be used to define data in any logical manner for a particular application.

The document type definition (DTD) is a file or multiple files used in combination written in XML declaration syntax. The DTD contains a formal description of a particular type of document. The DTD defines names used for element types, conditions in which the elements can be used, and how elements are used in combination. The DTD defines rules for usage by applications that define what names and structures can be used in a particular document type.

Usage of XML format is highly suitable since the format is widely used on the Internet and XML files can be parsed using industry standard technology.

In an illustrative embodiment, a camera intent DTD is described as follows:

structure of the camera and the structure of the intent file. The camera intent DTD associates the profile with the image to define the physical structure of the camera and the structure of the intent file. The DTD defines an attribute list associated with the camera that includes a required camera identification number.

The profile and an associated intent file create a base architecture for creating and executing intent on the image acquisition device.

In the illustrative example, a second element entry is the image profile that defines a profile for a group of one or more image files.

A third element entry defines an image group and attributes of the images including an image name that is required to identify the particular image.

A fourth element entry defines a group of destinations that can be accessed via the communication system 200. The DTD defines the structure of physical connections that are possible for communicating the image data. In the illustrative example, destinations include Email, DPOF, Eprint, Web, and Frame. Character data is required to define the names and icons associated with destinations in the group.

```
<--!DTD for setting camera intent. DTD defines structure of a profile and intent files -->
<!ELEMENT Camera (Profile|Image+)>
<!ATTLIST Camera camid ID #REQUIRED>
<!ELEMENT Profile (Group+)>
<!ELEMENT Image (Group+)>
<!ATTLIST Image name CDATA #REQUIRED>
<!ELEMENT Group (Email+|DPOF+|Eprint+|Web+|Frame+)*>
<!ATTLIST Group
      name            CDATA #REQUIRED
      icon            CDATA #REQUIRED>
<!--Share destinations that can be defined within a group or a list -->
<!ELEMENT Email EMPTY>
<!ATTLIST Email
      dest            CDATA #IMPLIED>
<!ELEMENT DPOF EMPTY>
<!ATTLIST DPOF
      size            CDATA #REQUIRED
      number          CDATA "1">
<!ELEMENT Eprint EMPTY>
<!ATTLIST Eprint
      dest            CDATA #IMPLIED
      size            CDATA #IMPLIED
      shipAddress     CDATA #IMPLIED
      billAddress     CDATA #IMPLIED
      card            CDATA #IMPLIED
      number          CDATA "1">
<!ELEMENT Web EMPTY>
<!ATTLIST Web
      dest            CDATA #IMPLIED
      album           CDATA #IMPLIED
      user            CDATA #IMPLIED
      password        CDATA #IMPLIED
      size            CDATA #IMPLIED>
<!ELEMENT Frame EMPTY>
<ATTLIST Frame
      receiver        CDATA #IMPLIED
      dest            CDATA #IMPLIED
      user            CDATA #IMPLIED
      password        CDATA #IMPLIED>
```

Entries in the DTD are set forth in Declaration Syntax, rather than Instance Syntax, with declarations beginning with the characters "<!" rather than an open angle bracket. The camera intent DTD defines and stores an intent that is set on a camera. The intent file uses standard and customary XML grammar structure to emulate the physical structure of the camera. An image is associated with the camera. In the illustrative example, the first element defines the camera and an image profile associated with the camera so that the image is associated with the camera and an intent is associated with the image. A profile describes the physical In the example, a fifth element entry defines the Email element in the destination group. The Email element can be used to define a particular email address that can be a destination address for receiving image data. A destination address, dest, is the attribute of the Email element.

A sixth element entry defines the DPOF element in the destination group. The DPOF element can be used to specify a destination for printing the image according to the digital print order format (DPOF) specification. The DPOF specification defines a print order format similar to traditional photo finishing capabilities. Digital camera users can select photographs directly in the camera without using a computer. The camera writes a DPOF file directly to removable media in the camera and is read and executed by printing services and applications. In the illustrative application, attributes of the DPOF element are used to specify the size of the photograph print and the number of copies of the print. In other examples, additional attributes may be included to specify printing features such as photo print selection, index printing of thumbnail images, image rotation, user information, or picture information. The DPOF specification permits software applications such as support for digital printers, kiosks, and photo finishing services that support reading and authoring of DPOF format files.

A seventh element entry defines the Eprint element in the destination group. The Eprint element can be used to specify a destination for electronically printing the image to an Eprint service that permits a user to view photographs on the Internet and purchase prints from a photographer. Attributes of the Eprint element include a destination address dest that specifies a photograph merchant to generate photographic images, and a size attribute that specifies the photograph print size. A shipAddress attribute specifies the address to ship the finished photograph and a billAddress attribute specifies the address to send the bill for performing the photo finishing services. A card attribute can be used to specify a credit card type such as Visa, Mastercard, Discover card, and the like for payment of the photograph finishing services. A number attribute can be used to specify the card number associated with the card defined by the card attribute.

An eighth element entry defines the Web element in the destination group. The Web element can be used to specify an Internet photography site that is capable of receiving, storing, and arranging image data from the camera. In one example, attributes of the Web element include a destination address dest that can specify a target photography website. One example is Cartogra.com, a Hewlett-Packard supported site. An album attribute is used to specify a particular album version that can be accessed by the user. User and password attributes are included to permit access to the particular website and album. A size attribute that specifies the photograph print size.

A ninth element entry defines the Frame element in the destination group. The Frame element can be used to specify a network image repository site that is capable of receiving and storing frame image data from the camera. In one example, attributes of the Frame element include a receiver specification that identifies the type of entity that can receive the data. Examples of receivers include Internet photography sites, databases, computer systems, and the like. A destination address dest can specify a target Frame repository. One example is Cartogra.com, a Hewlett-Packard supported site. User and password attributes are included to permit access to the particular website and album.

Additional element entries can be added to define new elements. Similarly, additional attributes can be defined to cover various aspects of the new elements. Accordingly, the intent is highly extensible to allow future technological advances to add easily to the camera solution. For example, when a successful web TV wireless upload technology becomes available, a Web TV destination can be added to the camera share option list. The modular structure of the profile and intent files is highly adaptable to new technologies when available.

The illustrative example depicts a profile with elements as described. A myriad of other examples may be implemented depending on the desires and conditions of a particular application.

Usage of markup language technology to define a camera profile and camera intent is highly useful for supplying seamless connectivity of a camera to any devices or systems capable of accessing, storing, manipulating, or otherwise using data from camera images. Usage of the markup language permits connectivity to be established among highly diverse devices and systems using a single simple set of access tools such as icons. Usage of the markup language permits highly flexible designs for adapting to new technologies.

Figure 3:
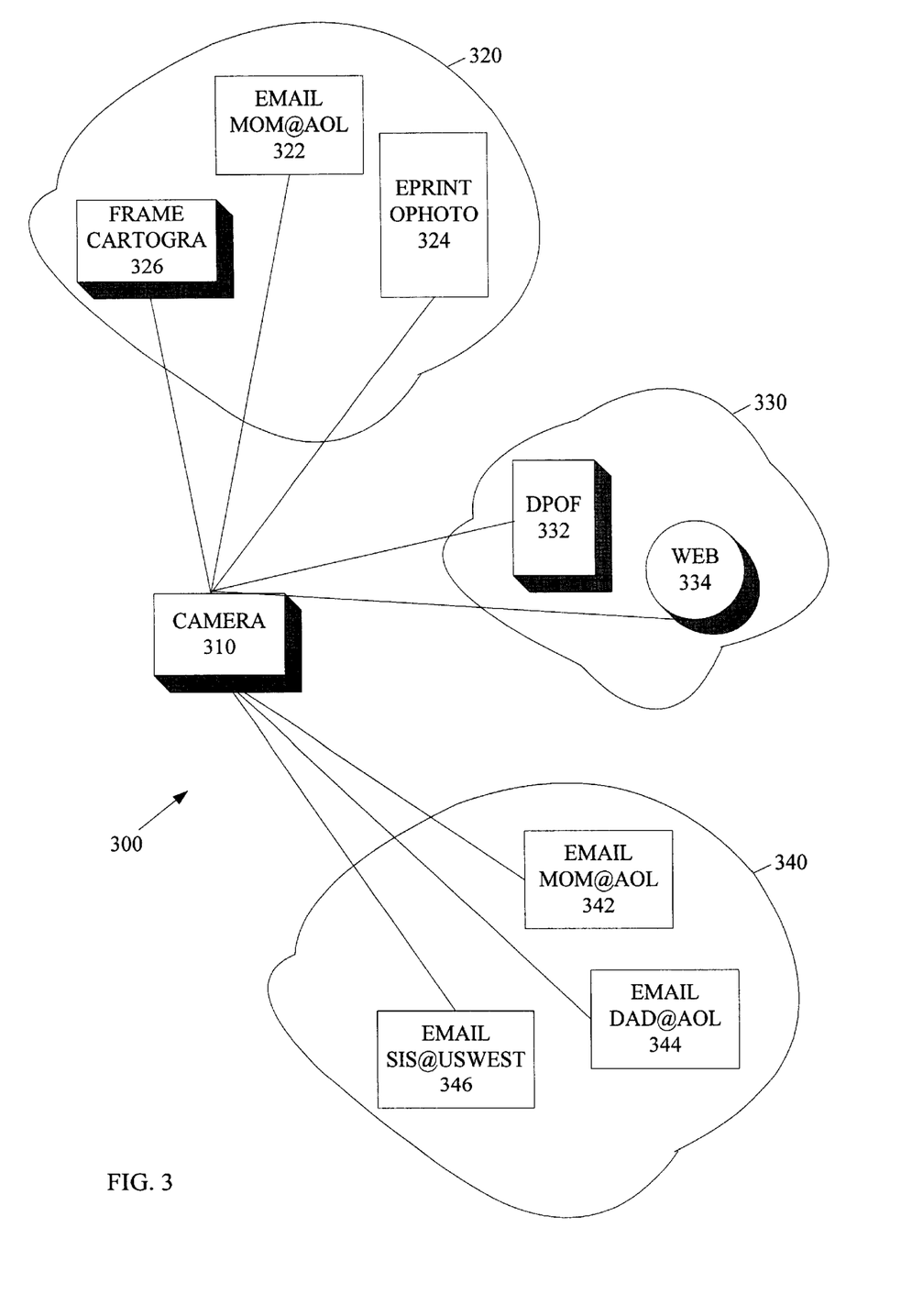
FIG. 3 is a schematic block diagram that illustrates an example profile for intent-capable cameras and scanners.

Referring to FIG. 3, a schematic block diagram illustrates an example profile 300 for intent-capable cameras. The camera profile can be written that conforms to the camera intent DTD. One example of an profile that defines intent for an intent-capable camera is as follows:

```
<?xml version='1.0' ?>
<!DOCTYPE Camera SYSTEM "profile.dtd">
<!-- Example profile for intent-capable cameras -->
<Camera camid="AF34-23432">
    <Profile>
        <Group name="mom" icon="mon2.ico">
            <Email dest=mom@aol.com/>
            <Eprint size="8.5x11" dest="ophoto"
                shipAddress="9820 North St, Greeley CO, 80536"/>
            <Frame dest="cartogra"/>
        </Group>
        <Group name="Print 4x6 and share" icon="print.ico">
            <DPOF size="4x6"/>
            <Web dest="cartogra" album="main"/>
        </Group>
        <Group name="my family" icon="fam4.ico">
            <Email dest=mom@aol.com/>
            <Email dest=dad@aol.com/>
            <Email dest=sister@uswest.net/>
        </Group>
    </Profile>
</Camera>
```

The illustrative camera intent profile is specified for a particular camera 310, camid "AF34-23432". The camera identification can be used in conjunction with various databases to identify characteristics of the camera. These characteristics can be used, for example, to facilitate operations such as color and illumination control. The profile specifies an intent with three groups. A first group 320 has a group name "mom" and is accessed via a "mom2" icon. Destinations in the "mom" group 320 include Email destination mom@aol.com 322, Eprint destination "ophoto" 324, and Frame destination "Cartogra" 326. Selection of the "mom" group 320 can be used to send image data to the destinations 322, 324, and 326. The Eprint entry 324 requests a particular image size and shipping address.

A second group 330 has a group name "Print 4x6 and share" and is accessed via a "print" icon. Destinations in the "Print 4x6 and share" group 330 include a digital print order format (DPOF) entry 332 that specifies a request for photo finishing of a 4x6 print, and a Web entry 334 that specifies the "Cartogra" photography web site. The Web entry 334 further specifies transfer of image data to the "main" album. Selection of the "Print 4x6 and share" group 330 can be used to enter image data to the Cartogra web site and order photo finishing from a photofinisher.

A third group 340 has a group name "my family" and is accessed via a "fam4" icon. Destinations in the "my family" group 340 include three Email destinations of family members including a mom@aol.com e-mail address destination 342, a dad@aol.com e-mail address destination 344, and a sister@uswest.net e-mail address destination 346.

In some embodiments, the profile creates specifies and creates a user interface for the camera. In the illustrative example, execution of the profile causes the system to create icons for the camera user interface (not shown) for each of the groups. Execution of the profile creates and displays the "mom2" icon, the "print" icon, and the "fam4" icon. The icons are displayed on the camera user interface. A user can press an icon to begin an image transfer.

Figure 4:
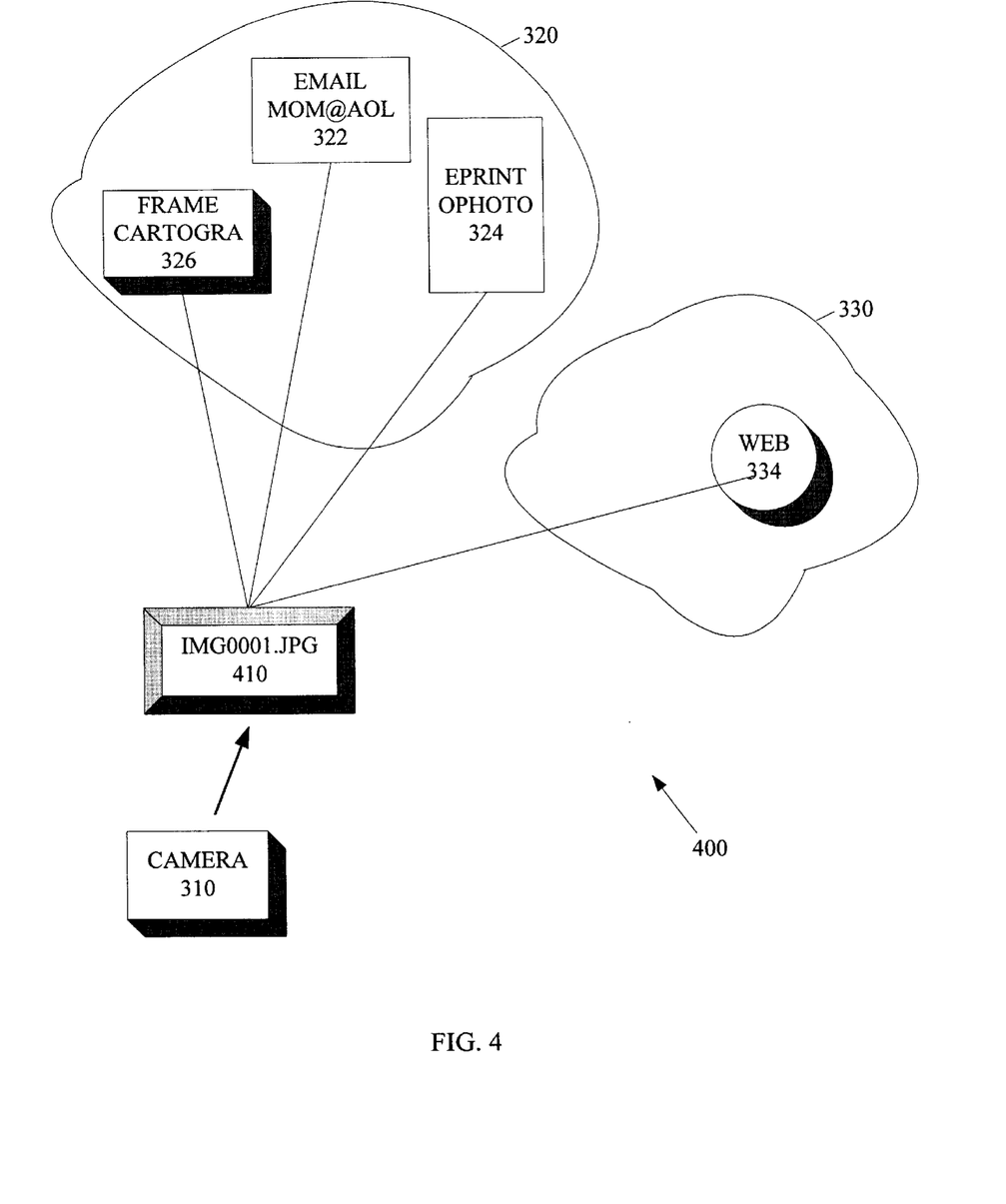
FIG. 4 is a schematic block diagram showing an example of an intent file that is defined for intent-capable cameras and scanners.

Referring to FIG. 4, a schematic block diagram illustrates an example intent file 400 that is defined for intent-capable cameras. A camera intent can be written that conforms to the camera intent DTD. One example of an intent file that defines intent for an intent-capable camera is as follows:

```
<?xml version='1.0' ?>
<!DOCTYPE Camera SYSTEM "profile.dtd">
<!-- Example intent file for intent-capable cameras -->
<Camera camid="AF34-23432">
    <Image name="IMG0001.jpg">
        <Group name="mom" icon="mon2.ico">
            <Email dest=mom@aol.com/>
            <Eprint size="8.5x11" dest="ophoto"
                shipAddress="9820 North St, Greeley CO, 80536"/>
            <Frame dest="cartogra"/>
        </Group>
        <Group name="Print 4x6 and share" icon="print.ico">
            <Web dest="cartogra" album="main"/>
        </Group>
    </Image>
</Camera>
```

The illustrative image intent file 400 is specified for the camera 310, camid "AF34-23432". The image intent file 400 specifies a particular image, in this case Image name "IMG0001.jpg" 410, and specifies the entities set forth in the profile 300 that are designated to receive the image 410. In the example, the image "IMG0001.jpg" 410 is a jpeg image file although other formats that are known by those of ordinary skill in the art can be used.

The intent file 400 specifies that two of the three groups defined in the profile 300 can receive the image "IMG0001.jpg" 410 including "mom" group 320 which is accessed via the "mom2" icon and "Print 4×6 and share" group 330 which is accessed via the "print" icon. "Mom" group 320 destinations enabled to access the image "IMG0001.jpg" 410 in the intent file 400 include Email destination mom@aol.com 322, Eprint destination "ophoto" 324, and Frame destination "Cartogra" 326. "Print 4×6 and share" group 330 destinations enabled to access the image "IMG0001.jpg" 410 in the intent file 400 include only the Web entry 334 that specifies the "Cartogra" photography web site.

Figure 5:
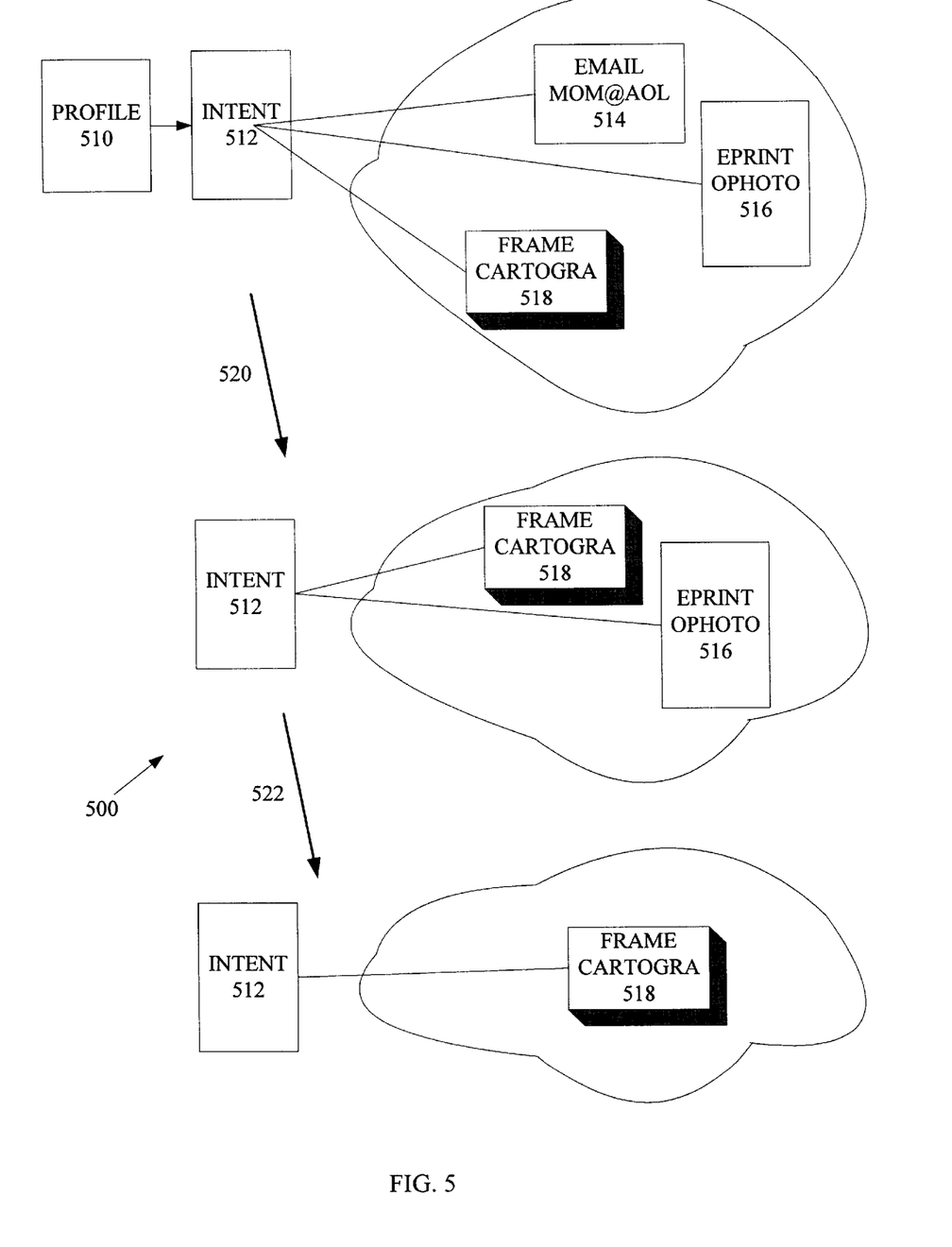
FIG. 5 is a schematic block diagram that illustrates a distributed intent example.

Referring to FIG. 5, a schematic block diagram illustrates a distributed intent example 500. Usage of the markup language to define a profile 510 and intent 512 enables intent to be fulfilled by a particular service and medium while the remaining intent is unaffected. Accordingly, intent 512 is executed through multiple media and services independently. For example, if intent 512 has been associated to an object such as email to mom and post to web TV, the email intent is fulfilled by connecting a device (camera) into the telephone jack while maintaining the post to web TV intent specific to the object. At a later time, the "post to web TV" operation is executed via wireless transfer. The intent files 512 can be modified to add or delete elements and attributes to attain a distributed intent functionality. An example of a distributed intent capability is illustrated using the following intent file that defines intent for an intent-capable camera is as follows:

```
<?xml version='1.0' ?>
<!DOCTYPE Camera SYSTEM "profile.dtd">
<!-- Example intent file for intent-capable cameras -->
<Camera camid="AF34-23432">
    <Image name="IMG0001.jpg">
        <Group name="mom" icon="mon2.ico">
            <Email dest=mom@aol.com/>
            <Eprint size="8.5x11" dest="ophoto"
                shipAddress="9820 North St, Greeley CO, 80536"/>
            <Frame dest="cartogra"/>
        </Group>
    </Image>
</Camera>
```

If the camera is attached at a telephone jack to a telephone line, then the email 514 transfer will be executed. After execution, the intent file 512 is modified 520 to remove the specific intent that was fulfilled by attaching to the telephone line, so that the intent file 512 has the form, after modification, as follows:

```
<?xml version='1.0' ?>
<!DOCTYPE Camera SYSTEM "profile.dtd">
<!-- Example intent file for intent-capable cameras -->
<Camera camid="AF34-23432">
    <Image name="IMG0001.jpg">
        <Group name="mom" icon="mon2.ico">
            <Eprint size="8.5x11" dest="ophoto"
                shipAddress="9820 North St, Greeley CO, 80536"/>
            <Frame dest="cartogra"/>
        </Group>
    </Image>
</Camera>
```

If the file is sent to a kiosk and the image is printed via an eprint operation 516, the intent file 512 is again modified 522 after the kiosk intent is executed, so that the intent file 512 after modification is, as follows:

```
<?xml version='1.0' ?>
<!DOCTYPE Camera SYSTEM "profile.dtd">
<!-- Example intent file for intent-capable cameras -->
<Camera camid="AF34-23432">
    <Image name="IMG0001.jpg">
        <Group name="mom" icon="mon2.ico">
            <Frame dest="cartogra"/>
        </Group>
    </Image>
</Camera>
```

The intent file 512 is updated via the service executing the intent. The medium for the service can be wireless, tether to a personal computer, telephone connection to the internet, or any suitable interconnection structure or method as is known to one of ordinary skill in the art.

The system and technique for implementing camera intent is modular and thus highly suitable for connectivity and execution of different types and forms of services. The system and technique of implementing camera intent using markup language techniques enables multiple independent services to fulfill a variety of intents associated with the objects.

Figure 6:
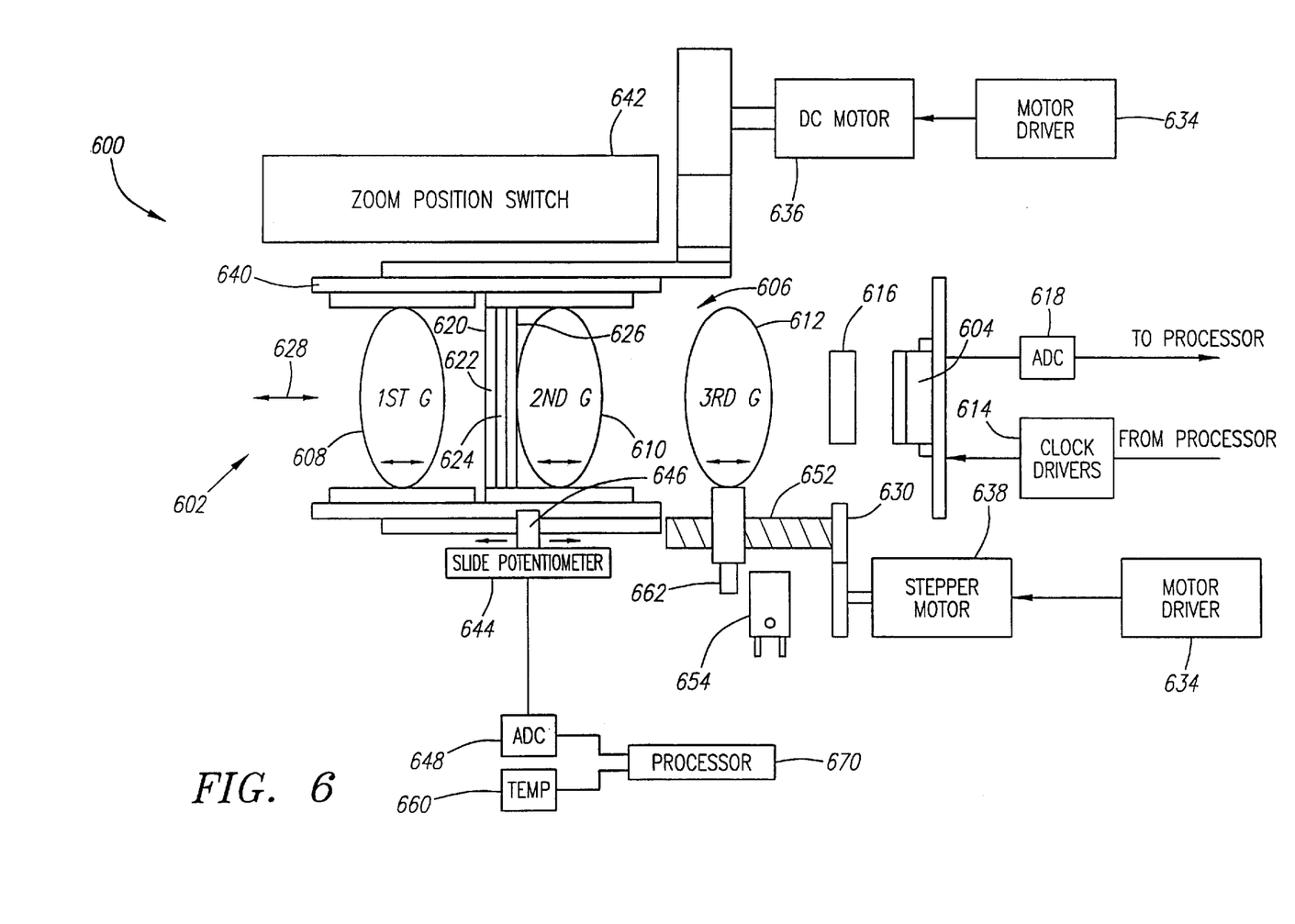
FIG. 6 is a schematic block diagram that illustrates an electronic camera that is suitable for implementing the illustrative image intent system.

Referring to FIG. 6, a schematic block diagram illustrates an electronic camera 602 that is suitable for implementing the illustrative image intent system. An image is detected at a sensor, for example a charge-coupled device (CCD) photo sensor 604 that detects light passing through a lens system 606. In the illustrative zoom and focus control system 600, the lens system 606 includes a plurality of lens groups, each of which includes one or more lenses. One example has three lens groups, first lens group 608, second lens group 610, and third lens group 612. The second lens group 610, termed a variator, changes the effective focal length of the lens and moves in a linear manner. The first lens group 608 moves in a nonlinear manner relative to the linear motion of the second lens group 610 and functions as a compensator. The first lens group 608 functions to hold the image plane relatively constant as the lens is zoomed over the range of focal lengths of the lens system 606. The third lens group 612 is a positive is a positive element that is moved to focus the lens system 606.

The CCD photo sensor 604 is a two-dimensional array of charge-coupled photo sensors used to capture the image that is focused onto the photo sensors by the lens system 606. The individual photo sensor sites are defined as pixels and have an associated color such as red, green, or blue. As the CCD photo sensor 604 is exposed to light, charge integrates at the individual pixel site proportional to the number of photons received at the site. Clock drivers 614 are connected to the CCD photo sensor 604 and propagate clock signals that are used to control the read-out process of the CCD photo sensor 604. Image processing hardware (not shown) generates the clock signals. The clock signals propagate from the image processing hardware through the clock drivers 614 to the CCD photo sensor 604. The clock drivers 614 supply clock signals with high levels of current at sufficient frequencies to drive highly capacitive CCD control lines.

A low pass filter 616 is connected to the CCD photo sensor 604 for usage as an anti-aliasing filter to avoid optical moire effects that occur due to the discrete nature of the CCD pixel structure. One suitable example of the low pass filter 616 includes two birefringent quartz plates (not shown) and a quarter-wave plate (not shown). One of the birefringent quart plates produces filtering with respect to a horizontal direction of the CCD array. The second birefringent plate produces filtering in a vertical direction of the CCD array, 90° shifted from the horizontal direction. The quarter-wave plate functions as a depolarizer. The term low-pass filter indicates imaging of only a low spatial frequency image.

The CCD photo sensor 604 generates image signals that are passed through an analog to digital converter (ADC) 618 to the image processing hardware. Row-by-row pixel image data is read from the CCD photo sensor 604 as an analog voltage and is passed to the analog to digital converter 618. The analog to digital converter 618 amplifies and digitizes the image signal. The digitization process generates an N-bit digital word for each pixel. The analog to digital converter 618 clocks the digital words for the pixels into the image processing hardware.

A shutter/aperture module 620 is interposed between the first lens group 608 and the second lens group 610. The shutter/aperture module 620 includes a shutter 622, apertures 624, and a neutral density filter 626. The shutter 622 is a blade that is switched into the optical path 628 of the lens system 606 to prevent light from reaching the CCD photo sensor 604. The shutter 622 typically is controlled to block the light at the end of an exposure time to complete image capture. The shutter 622 is also closed when the camera is powered off to protect the CCD photo sensor 604 from receiving excessive light, potentially causing damage to the individual sensor elements.

The apertures 624 are multiple blades containing different diameter holes. An aperture blade can be switched into the optical path 628 to reduce the amount of light transmitted through the lens system 606 to the CCD photo sensor 604. Different apertures 624 are used to control light exposure and to control the focus depth of field. A typical electronic camera that is used for still image reception has one or two aperture blades. Alternatively, the aperture 624 may be composed of a diaphragm with continuously variable aperture hole sizes to supply a greater number of selectable apertures.

The neutral density filter 626 is an additional blade that can be switched into the optical path 628. The neutral density filter 626 also reduces the amount of light that is transmitted through the lens system 606 to the CCD photo sensor 604. Although an aperture 624 and the neutral density filter 626 are similar in function, the neutral density filter 626 can be used to reduce the amount of light passing through the lens system 606 without affecting the focus depth of field. Usage of an aperture to reduce light to the CCD photo sensor 604 always affects the depth of focus. The neutral density filter 626 can be used in conjunction with the apertures 624 to further reduce the level of light passing to the CCD photo sensor 604.

The shutter/aperture module 620 is controlled by signals passed from a camera control block (not shown) via solenoids (not shown). Individual blades of the shutter 622, the apertures 624, and the neutral density filter 626 are actuated in and out of the lens optical path 628 by a solenoid. The individual solenoids are driven by a solenoid driver (not shown) which supplies the voltage and current for actuating the blades into position in a timely manner. The solenoid drivers are controlled by signals from a processor 670 such as a central processing unit (CPU), a microcontroller, or control logic. The camera control block may be software or firmware that executes on the processor 670.

The processor 670 determines relative positioning of the first lens group 608, the second lens group 610, and the third lens group 612, thus controlling zoom and focus functionality. The processor 670 executes application programs that supply control information to a motor driver 634, an executing program code supplying control signals to a DC motor 636 and a stepper motor 638. The DC motor 636 physically controls the position of the first lens group 608 and the second lens group 610 of the lens system 606. The stepper motor 638 physically controls the position of the third lens group 612. The first lens group 608 and the second lens group 610 are held by a lens barrel 640. DC motor 636 is connected to the lens barrel 640 and drives the rotation of the lens barrel 640 via a set of gears (not shown) between the lens barrel 640 and the DC motor 636. As the lens barrel 640 rotates, the positions of the first lens group 608 and the second lens group 610 are adjusted through the operation of cam slots (not shown) inside the lens barrel 640. A lens cam switch 642 is mounted on the lens barrel 640 and sends signal transitions to the processor as the lens barrel 640 rotates through a plurality of zoom positions. In one example, the electronic camera 602 has three zoom positions of wide, tele, and retract. A slider potentiometer 644 is connected to the lens barrel 640. As the lens barrel 640 rotates between the wide and tele zoom positions, the slider potentiometer 644 produces a fine zoom position information. A cam slot 646 in the lens barrel 640 drives the slider potentiometer 644 depending on the position of the wide and tele zoom position. The processor 670 determines the fine zoom position by reading the voltage obtained from the center tap of the slider potentiometer 644 via an analog-to-digital converter (ADC) 648. Fine zoom position values produced by the slider potentiometer 644 are calibrated by recording the slider potentiometer values when the lens cam switch 642 is positioned at the tele and wide positions.

In the illustrative electronic camera 602, the motor driver 634 sends signals to the stepper motor 638 that is connected to the third lens group 612 by gear reduction 650 and a lead screw 652. The stepper motor 638 receives signals from the processor via the motor driver 634 that determine the position and motion of the third lens group 612. In alternative systems, other types of motors and drive mechanisms can be used to controls lens position adjustment of the third lens group 612. Photo sensors 654 are connected to the motor and drive mechanism for the third lens group 612 to monitor positioning of the third lens group 612. The processor determines the initial position of the third lens group 612 by moving the lens group toward the photo sensor 654 and detecting when flag 662 mounted on the third lens group 612 reaches the photo sensor 654. The position at which the photo sensor 654 detects the flag is a home position. The processor measures the position of the third lens group 612 relative to the home position. The processor tracks the number of steps the stepper motor 638 executes in all moves relative to the home position.

The motor driver 634 supplies voltage and current to the DC motor 636 and the stepper motor 638, thus determining the position and motion of the first lens group 608 and second lens group 610, and the third lens group 612. The motor driver 634 is controlled by signals from the processor.

A temperature sensor 660 inside the electronic camera 602 measures temperature and is connected to the processor. The processor includes a processing logic that is capable of adjusting a starting position of the lenses to adjust focus for temperature differences.

While the invention has been described with reference to various embodiments, it will be understood that these embodiments are illustrative and that the scope of the invention is not limited to them. Many variations, modifications, additions and improvements of the embodiments described are possible. Although the examples shown herein illustrate the image acquisition device as a digital camera, other types of image acquisition devices such as scanners are similarly within the invention scope. For example, those having ordinary skill in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, one or ordinary skill in the art could similarly apply the first and second quality-of-service techniques to the other interconnect structures described herein.

In the claims, unless otherwise indicated the article "a" is to refer to "one or more than one".

What is claimed is:

1. A system for setting intent on an image acquisition device comprising:
   a image intent file capable of execution on a processor and compliant with a markup language grammar structure, the image intent file being capable of distributed intent execution on multiple types of devices and further comprising:
      one or more elements that specify a physical structure of an image acquisition device;
      one or more elements that associate an image with the image acquisition device; and
      one or more elements that associate an intent with the image.

2. A system according to claim 1 further comprising:
   one or more elements that emulate the physical structure of an image acquisition device selected from among cameras and scanners.

3. A system according to claim 1 further comprising:
   a profile that describes and creates a base architecture for creating and executing distributed intent on the image acquisition device, the profile being created on the image acquisition device, computer, or web site and being executable on a image acquisition device processor and defining and creating icons for one or more groups, the groups specifying image destinations, the image intent file being executable on the image acquisition device processor and other processors in a communication stream.

4. A system according to claim 1 further comprising:
   an image acquisition device;
   a memory coupled to the image acquisition device and capable of storing images acquired by the image acquisition device;
   a processor coupled to the image acquisition device and coupled to the memory, the processor capable of controlling the image acquisition device and accessing images from the memory; and
   one or more elements that define intent specific to a particular image contained in the memory.

5. A system according to claim 1 further comprising:
   an image acquisition device;
   a memory coupled to the image acquisition device and capable of storing images acquired by the image acquisition device;
   a processor coupled to the image acquisition device and coupled to the memory, the processor capable of controlling the image acquisition device and accessing images from the memory;
   an information handling system coupled to the processor; and
   a storage device coupled to the information handling system, the storage device being capable of storing the image intent file.

6. A system according to claim 1 further comprising:
   a profile that operates in combination with the image intent file to map the physical structure of an image acquisition device using data structures that are easily extensible and modular.

7. A system according to claim 1 further comprising:
   a image intent file capable of execution on a processor and compliant with eXtensible markup language (XML) standards that are widely used on the Internet so that the intent file can be parsed by devices compliant with industry standard.

8. A system according to claim 1 further comprising:
   a profile that operates in combination with the image intent file to map the physical structure of an image acquisition device using data structures that are easily extensible and modular; and
   one or more attributes associated with the elements, the attributes for specifying a characteristic of the element, the one or more attributes including share options that can be used for extensibility to future technologies.

9. A system according to claim 1 further comprising:
   one or more elements that mark images or files with a distribution destination so that the intent is distributed independently among destinations with a portion of the intent being fulfilled while maintaining any unfulfilled intent.

10. A system according to claim 1 further comprising:
   one or more elements that define an intent that is fulfilled by a specific service and medium while not affecting other remaining intents specified in the image intent file, the intent being executed through multiple media and services independently.

11. A method of setting intent on an image acquisition device comprising:

defining a image acquisition device intent capable of execution on a processor and compliant with a markup language grammar structure;

specifying a physical structure of an image acquisition device by one or more elements of the image acquisition device intent;

associating an image with the image acquisition device by one or more elements of the image acquisition device intent; and associating an intent with the image by one or more elements of the image acquisition device intent.

12. A method according to claim 11 further comprising:

describing a base architecture by a profile;

creating and executing intent on the image acquisition device using the base architecture;

executing the profile on an image acquisition device processor;

defining one or more groups to specify image destinations;

creating icons for the one or more groups; and executing the image intent file on the image acquisition device processor and other processors in a communication stream.

13. A method according to claim 11 further comprising:

operating a profile in combination with a image intent file; and mapping the physical structure of an image acquisition device using data structures defined in the profile and image intent file that are easily extensible and modular.

14. A method according to claim 11 further comprising:

applying a image intent file capable of execution on a processor and compliant with eXtensible markup language (XML) standards that are widely used on the Internet; and parsing the intent file by devices compliant with industry standard.

15. A method according to claim 11 further comprising:

operating a profile in combination with a image intent file;

mapping the physical structure of an image acquisition device using data structures in the profile and image intent file that are easily extensible and modular;

specifying one or more attributes associated with the elements; and specifying a characteristic of the element by one or more attributes, the one or more attributes including share options that can be used for extensibility to future technologies.

16. A method according to claim 11 further comprising:

distributing intent using one or more elements that mark images or files with a distribution destination.

17. A method according to claim 11 further comprising:

defining an intent that is fulfilled by a specific service and medium while not affecting other remaining intents specified in the image intent file; and executing the intent through multiple media and services independently.

18. A computer program product for usage with a digital image acquisition device and an information handling system, the computer program product comprising:

a computable and transferable set of commands and instructions configured as a image intent file capable of execution on a processor and compliant with a markup language grammar structure, the image intent file further comprising:

one or more elements that specify a physical structure of an image acquisition device;

one or more elements that associate an image with the image acquisition device; and one or more elements that associate an intent with the image.

19. A computer program product according to claim 18 further comprising:

a computable and transferable set of commands and instructions configured as a profile that describes a base architecture, the profile being executable on an image acquisition device processor and defining and creating icons for one or more groups, the groups specifying image destinations, the image intent file being executable on the image acquisition device processor and other processors in a communication stream.

20. A computer program product according to claim 18 further comprising:

a computable and transferable set of commands and instructions configured as a image intent file capable of execution on a processor and compliant with eXtensible markup language (XML) standards that are widely used on the Internet so that the intent file can be parsed by devices compliant with industry standard.

* * * * *